United States Patent

Hiraoka et al.

[11] Patent Number: 5,294,419
[45] Date of Patent: Mar. 15, 1994

[54] METHOD FOR REMOVING NITROGEN OXIDES AND ORGANIC CHLORINE COMPOUNDS FROM COMBUSTION WASTE GAS

[75] Inventors: Masakatsu Hiraoka, 39-763, Kohata Okurayama, Uji-shi, Kyoto; Toshihiko Iwasaki, Tokyo; Haruhito Tsuboi, Tokyo; Takashi Noto, Tokyo; Miki Yamagishi, Tokyo; Takashi Yokoyama, Tokyo; Yasuo Suzuki, Tokyo; Yoshinori Imoto, Nagoya; Osamu Ishikawa; Katsuhiro Tokura, both of Handa, all of Japan

[73] Assignees: Masakatsu Hiraoka, Kyoto; NKK Corporation, Tokyo; NGK Insulators, Nagoya, all of Japan

[21] Appl. No.: 791,571

[22] Filed: Nov. 12, 1991

[30] Foreign Application Priority Data

Nov. 30, 1990 [JP] Japan ................................. 2-339678
Nov. 30, 1990 [JP] Japan ................................. 2-339679
Feb. 18, 1991 [JP] Japan ................................. 3-045730

[51] Int. Cl.$^5$ ........................... B01J 8/00; C01B 21/00; C10H 23/00
[52] U.S. Cl. ................................. 423/239.1; 423/245.1; 423/245.3
[58] Field of Search ............ 423/235, 245.3, 239, 423/239 A, 245.1

[56] References Cited

U.S. PATENT DOCUMENTS 4,389,382 6/1983 Gandhi et al. .................... 423/235
4,981,659 1/1991 Chuang et al. .................... 423/235

FOREIGN PATENT DOCUMENTS 3601917 7/1987 European Pat. Off. .
0380143 8/1990 European Pat. Off. .
0387417 9/1990 European Pat. Off. .
9104780 4/1991 European Pat. Off. .
54-29419 9/1979 Japan .
62-65721 3/1987 Japan .
63-290314 11/1988 Japan .

Primary Examiner—Gregory A. Heller
Attorney, Agent, or Firm—Frishauf, Holtz, Goodman & Woodward

[57] ABSTRACT

A method for removing nitrogen oxides and organic chlorine compounds from a combustion waste gas, which comprises the steps of: adding ammonia ($NH_3$) as a reducing agent to a combustion waste gas containing nitrogen oxides and organic chlorine compounds; causing the combustion waste gas added with ammonia to contact with, while keeping the temperature of the combustion waste gas within a prescribed range, with a catalyst comprising at least one selected from the group consisting of platinum (Pt), palladium (Pd), ruthenium (Ru), manganese (Mn), copper (Cu), chromium (Cr) and iron (Fe) and oxides thereof, supported on the surface of a carrier comprising at least one selected from the group consisting of titanium oxide ($TiO_2$), silicon oxide ($SiO_2$), aluminum oxide ($Al_2O_3$) and zirconium oxide ($ZrO_2$), thereby removing nitrogen oxides and organic chlorine compounds from the combustion waste gas.

6 Claims, 4 Drawing Sheets

FIG. I
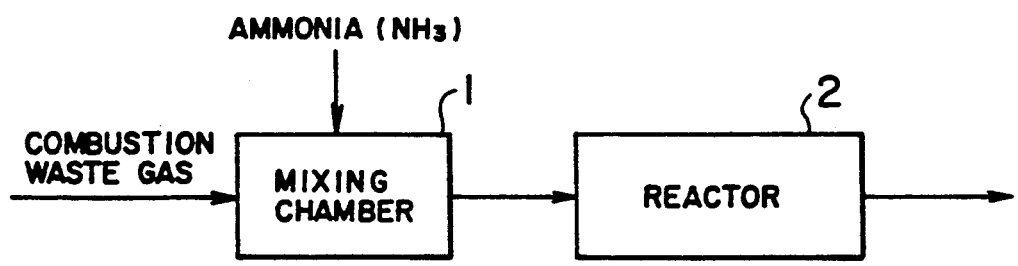
FIG. 2
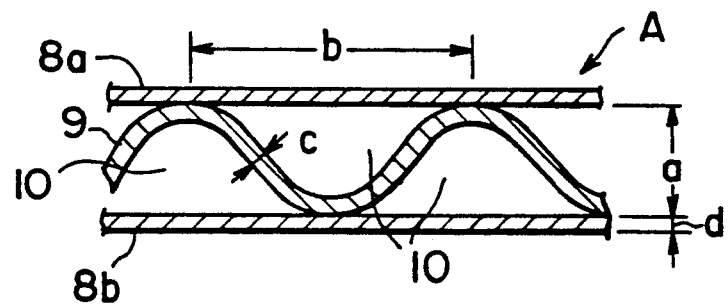
FIG. 3
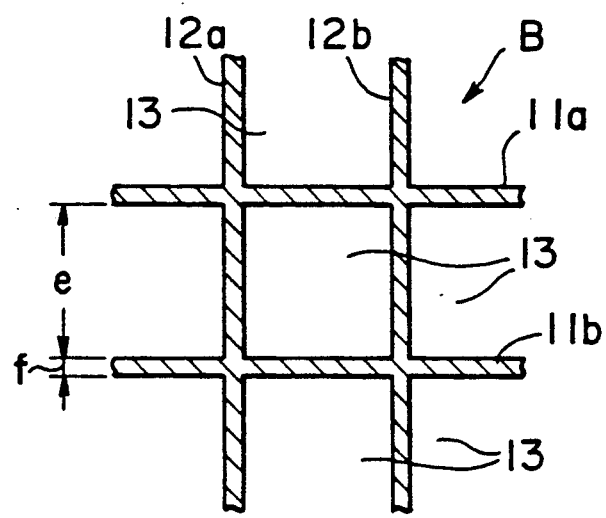

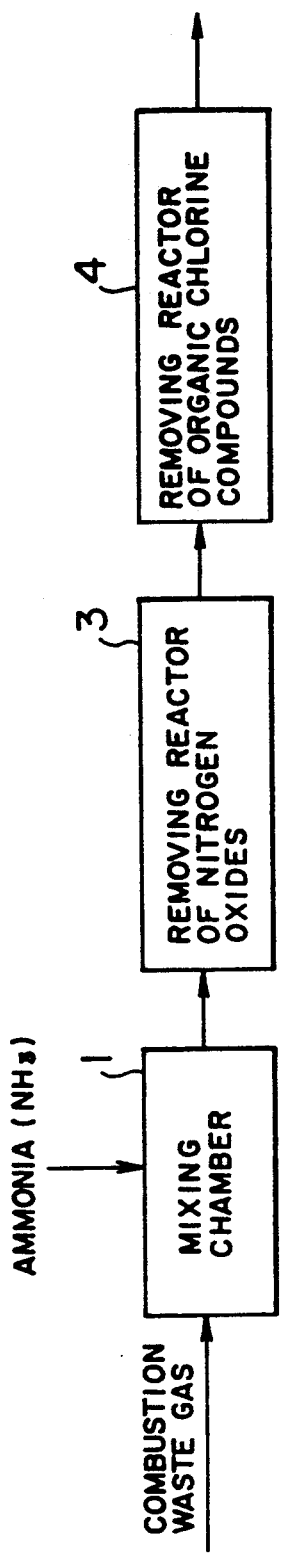
F I G. 4
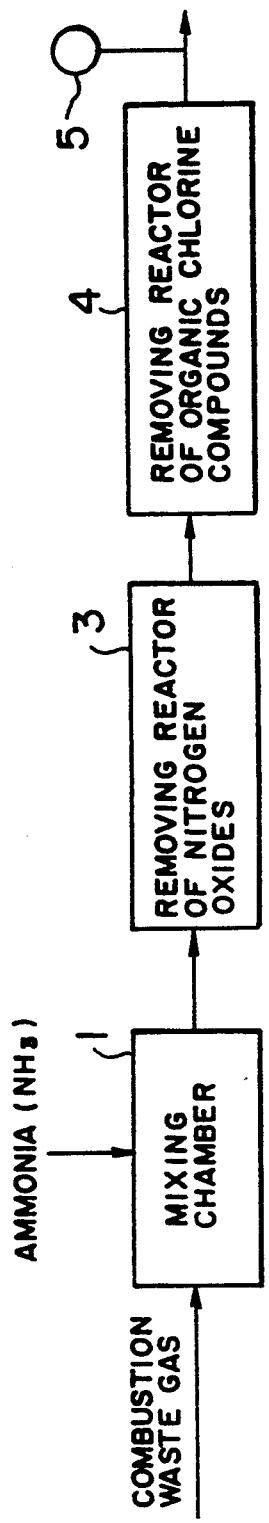
F I G. 5

METHOD FOR REMOVING NITROGEN OXIDES AND ORGANIC CHLORINE COMPOUNDS FROM COMBUSTION WASTE GAS

REFERENCE TO PATENTS, APPLICATIONS AND PUBLICATIONS PERTINENT TO THE INVENTION

As far as we know, there are available the following prior art documents pertinent to the present invention:
(1) Japanese Patent Publication No. 54-29,419 dated Sep. 22, 1979,
(2) Japanese Patent Provisional Publication No. 63-290,314 dated Nov. 28, 1988, and
(3) Japanese Patent Provisional Publication No. 62-65,721 dated Mar. 25, 1987.

The contents of the prior art disclosed in the above-mentioned prior art documents will be discussed hereafter under the heading of the "BACKGROUND OF THE INVENTION."

BACKGROUND OF THE INVENTION

1. Field of the Invention

The present invention relates to a method for removing detrimental substances, i.e., nitrogen oxides and organic chlorine compounds such as polychlorinated dibenzo-p-dioxins and polychlorinated dibenzofurans from a combustion waste gas discharged from an incinerator, and a filter for removing dust and detrimental substances as described above from the above-mentioned combustion waste gas.

2. Related Art Statement

Industrial and household wastes are incinerated in an incinerator, and such wastes often contain chlorine compounds these days. When wastes containing chlorine compounds are incinerated, a combustion waste gas produced in the incinerator and discharged therefrom contains detrimental substances, i.e., nitrogen oxides ($NO_x$) and organic chlorine compounds such as polychlorinated dibenzo-p-dioxins (PCDDs) and polychlorinated dibenzofurans (PCDFs). Particularly, organic chlorine compounds in the combustion waste gas, though slight in amount, have a very strong toxicity. It is therefore very important for pollution control to remove detrimental nitrogen oxides and also detrimental organic chlorine compounds from a combustion waste gas. Under such circumstances, various methods for removing the above-mentioned detrimental substances from a combustion waste gas have been developed.

Japanese Patent Publication No. 54-29,419 dated Sep. 22, 1979 discloses a method for removing nitrogen oxides from a combustion waste gas, which comprises the steps of:

adding ammonia as a reducing agent to a combustion waste gas; and causing said combustion waste gas added with said ammonia as the reducing agent to contact with a catalyst for reducing nitrogen oxides to reduce nitrogen oxides contained in said combustion waste gas so as to decompose same, thereby removing said nitrogen oxides from said combustion waste gas (hereinafter referred to as the "prior art 1").

Japanese Patent Provisional Publication No. 63-290,314 dated Nov. 28, 1988 discloses a method for removing organic chlorine compounds from a combustion waste gas, which comprises the steps of:

causing a combustion waste gas to contact, while keeping the temperature of said combustion waste gas within a range of from 300° to 900° C. with a catalyst for oxidizing organic chlorine compounds to oxidize organic chlorine compounds contained in said combustion waste gas so as to decompose same, thereby removing said organic chlorine compounds from said combustion waste gas (hereinafter referred to as the "prior art 2").

Japanese Patent Provisional Publication No. 62-65,721 dated Mar. 25, 1987 discloses a method for removing nitrogen oxides, carbon monoxide, hydrocarbon and organic compounds containing oxygen such as aldehyde from a combustion waste gas, which comprises the steps of:

adding ammonia as a reducing agent to a combustion waste gas;

causing said combustion waste gas added with said ammonia as the reducing agent to contact with a catalyst for reducing nitrogen oxides to reduce nitrogen oxides contained in said combustion waste gas so as to decompose same, thereby removing said nitrogen oxides from said combustion waste gas; and causing said combustion waste gas, from which said nitrogen oxides have thus been removed, to contact with an oxidizing catalyst comprising platinum and/or palladium to oxidize carbon monoxide, hydrocarbon and organic compounds containing oxygen such as aldehyde contained in said combustion waste gas so as to decompose same, thereby removing said carbon monoxide, said hydrocarbon and said organic compounds containing oxygen such as aldehyde from said combustion waste gas (hereinafter referred to as the "prior art 3").

According to the prior art 1, it is possible to remove only nitrogen oxides from the combustion waste gas. In the prior art 1, however, no regard is paid to the removal of both nitrogen oxides, and organic chlorine compounds such as polychlorinated dibenzo-p-dioxins (PCDDs) and polychlorinated dibenzofurans (PCDFs) from the combustion waste gas.

According to the prior art 2, it is possible to remove organic chlorine compounds from the combustion waste gas. Also in the prior art 2, however, no regard is paid to the removal of both nitrogen oxides, and organic chlorine compounds such as polychlorinated dibenzo-p-dioxins (PCDDs) and polychlorinated dibenzofurans (PCDFs) from the combustion waste gas.

According to the prior art 3, it is possible to remove nitrogen oxides, carbon monoxide, hydrocarbon and organic compounds containing oxygen such as aldehyde. Also in the prior art 3, however, no regard is paid to the removal of both nitrogen oxides, and organic chlorine compounds such as polychlorinated dibenzo-p-dioxins (PCDDs) and polychlorinated dibenzofurans (PCDFs) from the combustion waste gas.

Under such circumstances, there is a strong demand for the development of a method for efficiently removing detrimental substances, i.e., both nitrogen oxides, and organic chlorine compounds such as polychlorinated dibenzo-p-dioxins and polychlorinated dibenzofurans from a combustion waste gas discharged from an incinerator, but such a method has not as yet been proposed.

A combustion waste gas discharged from an incinerator contains dust in a large quantity in addition to the above-mentioned detrimental substances. It is therefore the usual practice to introduce the combustion waste gas discharged from the incinerator into a dust collector, remove dust from the combustion waste gas by means of a filter provided in the dust collector, and apply to the combustion waste gas, from which dust has thus been removed, a conventional method for removing the above-mentioned detrimental substances from the combustion waste gas, for example, any of the prior arts 1 to 3.

When removing dust and organic chlorine compounds from a combustion waste gas, for example, it is the conventional practice to remove dust from the combustion waste gas by means of a dust collector provided between an incinerator and a stack, and then remove organic chlorine compounds from the combustion waste gas, from which dust has thus been removed, by means of a removing reactor of organic chlorine compounds provided between the dust collector and the stack. In the conventional method, as described above, it is necessary to separately provide the dust collector and the removing reactor of organic chlorine compounds, this inevitably requiring a large site, complicated equipment, and consequently high equipment and running costs.

Under such circumstances, there is a strong demand for the development of a filter, to be attached to a dust collector, which efficiently removes not only dust but also the above-mentioned detrimental substances from a combustion waste gas discharged from an incinerator, and permits achievement of small-scale equipment for the disposal of the combustion waste gas, thereby reducing the equipment and running costs, but such a filter has not as yet been proposed.

SUMMARY OF THE INVENTION

An object of the present invention is therefore to provide a method for efficiently removing detrimental substances, i.e., both nitrogen oxides, and organic chlorine compounds such as polychlorinated dibenzo-p-dioxins and polychlorinated dibenzofurans from a combustion waste gas discharged from an incinerator.

Another object of the present invention is to provide a filter, to be attached to a dust collector, which efficiently removes not only dust but also the above-mentioned detrimental substances from a combustion waste gas discharged from an incinerator, and permits achievement of a small-scale equipment for the disposal of the combustion waste gas, thereby reducing the equipment and running costs.

In accordance with one of the features of the present invention, there is provided a method for removing nitrogen oxides and organic chlorine compounds from a combustion waste gas, which comprises the steps of:

adding ammonia ($NH_3$) as a reducing agent to a combustion waste gas containing nitrogen oxides and organic chlorine compounds; and causing said combustion waste gas added with said ammonia as the reducing agent to contact, while keeping the temperature of said combustion waste gas within a range of from 150° to 340° C., with a catalyst comprising at least one selected from the group consisting of platinum (Pt), palladium (Pd), ruthenium (Ru), manganese (Mn), copper (Cu), chromium (Cr) and iron (Fe) and oxides thereof, supported on the surface of a carrier comprising at least one selected from the group consisting of titanium oxide ($TiO_2$), silicon oxide ($SiO_2$), aluminum oxide ($Al_2O_3$) and zirconium oxide ($ZrO_2$), to reduce said nitrogen oxides contained in said combustion waste gas so as to decompose same, and at the same time to oxidize said organic chlorine compounds contained in said combustion waste gas so as to decompose same, thereby removing said nitrogen oxides and said organic chlorine compounds from said combustion waste gas.

In accordance with another one of the features of the present invention, there is provided a method for removing nitrogen oxides and organic chlorine compounds from a combustion waste gas, which comprises the steps of:

adding ammonia ($NH_3$) as a reducing agent to a combustion waste gas containing nitrogen oxides and organic chlorine compounds;

causing said combustion waste gas added with said ammonia as the reducing agent to contact, while keeping the temperature of said combustion waste gas within a range of from 150° to 500° C., with a catalyst for reducing nitrogen oxides to reduce said nitrogen oxides contained in said combustion waste gas so as to decompose same, thereby removing said nitrogen oxides from said combustion waste gas; and causing said combustion waste gas from which said nitrogen oxides have thus been removed to contact, while keeping the temperature of said combustion waste gas within a range of from 150° to 500° C., with a catalyst for oxidizing organic chlorine compounds to oxidize said organic chlorine compounds and residual ammonia contained in said combustion waste gas so as to decompose same, thereby removing said organic chlorine compounds and said residual ammonia from said combustion waste gas.

In accordance with a further another one of the features of the present invention, there is provided a filter, to be attached to a dust collector, for removing dust and organic chlorine compounds from a combustion waste gas, wherein:

at least a part of said filter comprises a catalyst which contacts with organic chlorine compounds contained in a combustion waste gas to oxidize same, thereby decomposing said organic chlorine compounds.

BRIEF DESCRIPTION OF THE DRAWINGS

FIG. 1 is a flow diagram illustrating an embodiment of a first method of the present invention.

FIG. 2 is a schematic partial sectional view illustrating a typical carrier used in the first method of the present invention, for supporting a catalyst on the surface thereof.

FIG. 3 is a schematic partial sectional view illustrating another carrier used in the first method of the present invention, for supporting the catalyst on the surface thereof.

FIG. 4 is a flow diagram illustrating a first embodiment of a second method of the present invention.

FIG. 5 is a flow diagram illustrating a second embodiment of the second method of the present invention.

DETAILED DESCRIPTION OF PREFERRED EMBODIMENTS

Figure 6:
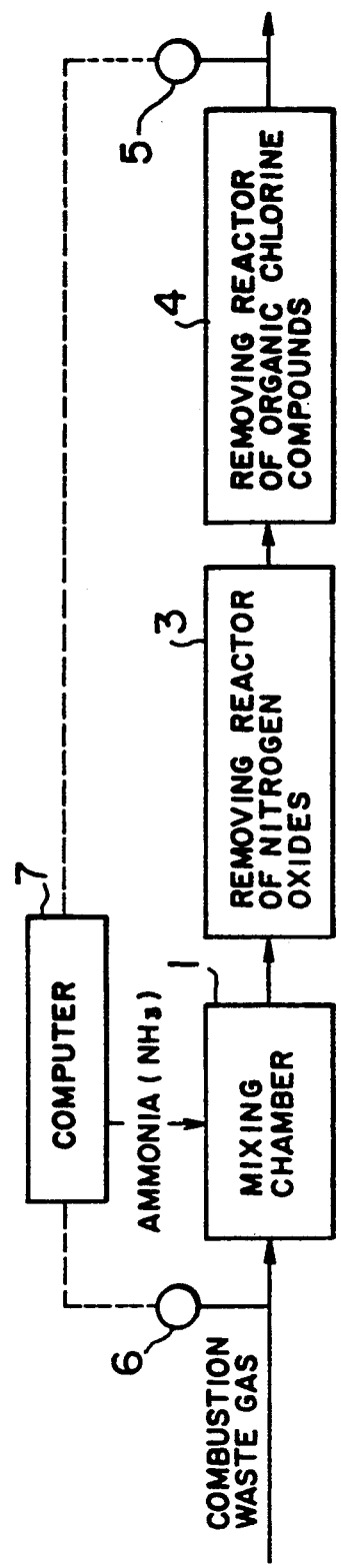
FIG. 6 is a flow diagram illustrating a third embodiment of the second method of the present invention.

From the above-mentioned point of view, extensive studies were carried out to develop a method for efficiently removing detrimental substances, i.e., both nitrogen oxides, and organic chlorine compounds such as polychlorinated dibenzo-p-dioxins and polychlorinated dibenzofurans from a combustion waste gas discharged from an incinerator, and a filter, to be attached to a dust collector, which efficiently removes not only dust but also the above-mentioned detrimental substances from a combustion waste gas discharged from an incinerator, and permits achievement of a small-scale equipment for disposal of the combustion waste gas, thereby reducing the equipment and running costs.

As a result, the following findings were obtained:

(1) By adding ammonia ($NH_3$) as a reducing agent to a combustion waste gas containing nitrogen oxides and organic chlorine compounds; and causing the combustion waste gas added with ammonia as the reducing agent to contact, while keeping the temperature of the combustion waste gas within a range of from 150° to 340° C., with a catalyst comprising at least one selected from the group consisting of platinum (Pt), palladium (Pd), ruthenium (Ru), manganese (Mn), copper (Cu), chromium (Cr) and iron (Fe) and oxides thereof, supported on the surface of a carrier comprising at least one selected from the group consisting of titanium oxide ($TiO_2$), silicon oxide ($SiO_2$), aluminum oxide ($Al_2O_3$) and zirconium oxide ($ZrO_2$), it is possible to reduce nitrogen oxides contained in the combustion waste gas so as to decompose same, and at the same time, to oxidize organic chlorine compounds contained in the combustion waste gas so as to decompose same, thereby effectively removing nitrogen oxides and organic chlorine compounds from the combustion waste gas.

(2) By adding ammonia ($NH_3$) as a reducing agent to a combustion waste gas containing nitrogen oxides and organic chlorine compounds; causing the combustion waste gas added with ammonia as the reducing agent to contact, while keeping the temperature of the combustion waste gas within a range of from 150° to 500° C., with a catalyst for reducing nitrogen oxides, it is possible to reduce nitrogen oxides contained in the combustion waste gas so as to decompose same, thereby efficiently removing nitrogen oxides from the combustion waste gas; and then, by causing the combustion waste gas from which nitrogen oxides have thus been removed to contact, while keeping the temperature of the combustion waste gas within a range of from 150° to 500° C., with a catalyst for oxidizing organic chlorine compounds, it is possible to oxidize organic chlorine compounds and residual ammonia contained in the combustion waste gas so as to decompose same, thereby efficiently removing organic chlorine compounds and residual ammonia from the combustion waste gas.

(3) By forming at least a part of a filter, to be attached to a dust collector, out of a catalyst which contacts with organic chlorine compounds contained in a combustion waste gas to oxidize same so as to decompose same, it is possible to efficiently remove not only dust but also organic chlorine compounds from the combustion waste gas.

The present invention was made on the basis of the above-mentioned findings. A first method and a second method of the present invention for removing nitrogen oxides and organic chlorine compounds from a combustion waste gas, and a filter of the present invention, to be attached to a dust collector, for removing dust and organic chlorine compounds from a combustion waste gas, are described below further in detail with reference to the drawings.

FIG. 1 is a flow diagram illustrating an embodiment, of the first method of the present invention.

The first method of the present invention comprises: a step of adding ammonia ($NH_3$) as a reducing agent to a combustion waste gas containing nitrogen oxides, organic chlorine compounds and oxygen (hereinafter referred to as the "step 1"), and a step of causing the combustion waste gas added with ammonia as the reducing agent to contact, while keeping the temperature of the combustion waste gas within a prescribed range as described later, with a catalyst having a prescribed chemical composition as described later under the presence of ammonia and oxygen (hereinafter referred to as the "step 2"). As shown in FIG. 1, the step 1 is carried out in a mixing chamber 1 provided between an incinerator (not shown) and a stack (not shown), and the step 2 is conducted in a reactor 2 provided between the mixing chamber 1 and the stack.

In the mixing chamber 1, ammonia as the reducing agent is added in a gaseous form to the combustion waste gas. An aqueous ammonia solution may be sprinkled on the combustion waste gas. Ammonia has a function of reducing nitrogen oxides contained in the combustion waste gas under the presence of a catalyst having a prescribed chemical composition as described later to decompose same. Depending upon the temperature of the combustion waste gas, in general, nitrogen oxides contained in the combustion waste gas are hardly reduced in the mixing chamber 1 by means of ammonia added to the combustion waste gas in the mixing chamber 1. The reason is that the above-mentioned catalyst is not present in the mixing chamber 1.

There is arranged, in the reactor 2, a catalyst comprising at least one selected from the group consisting of platinum (Pt), palladium (Pd), ruthenium (Ru), manganese (Mn), copper (Cu), chromium (Cr) and iron (Fe) and oxides thereof, supported on the surface of a carrier comprising at least one selected from the group consisting of titanium oxide ($TiO_2$), silicon oxide ($SiO_2$), aluminum oxide ($Al_2O_3$) and zirconium oxide ($ZrO_2$). Such a catalyst supported on the surface of the above-mentioned carrier has a function of accelerating a catalytic reaction of reducing nitrogen oxides contained in the combustion waste gas and another function of accelerating a catalytic reaction of oxidizing organic chlorine compounds contained in the combustion waste gas. By using the above-mentioned catalyst, it is possible to prevent deterioration of the functions of the catalyst caused by sulfur oxides ($SO_x$), hydrogen chloride (HCl) or halogen contained in the combustion waste gas, thus permitting maintenance of the stable functions of the catalyst for a long period of time.

The carrier supporting such a catalyst on the surface thereof should preferably comprises any one selected from the group consisting of a composite compounds ($TiO_2$-$SiO_2$) of titanium oxide and silicon oxide, a composite compound ($TiO_2$-$ZrO_2$) of titanium oxide and zirconium oxide, a composite compound ($TiO_2$-$SiO_2$-$Al_2O_3$) of titanium oxide, silicon oxide and aluminum oxide, and a composite compound ($TiO_2$-$SiO_2$-$ZrO_2$) of titanium oxide, silicon oxide and zirconium oxide.

When the above-mentioned carrier is formed of a substrate comprising mullite ($3Al_2O_3 \cdot SiO_2$) and a layer comprising titanium oxide ($TiO_2$) formed on the surface of the substrate, the substrate comprising mullite ($3Al_2O_3 \cdot SiO_2$) is protected by the titanium oxide ($TiO_2$) layer, thus improving resistance to acid of the carrier. Furthermore, the titanium oxide ($TiO_2$) layer, having fine jogs on the surface thereof, has a large surface area sufficient to support a large quantity of fine particles of the catalyst, thus permitting effective performance of the functions of the catalyst.

The carrier may have any of shapes including a columnar shape, a hollow cylindrical shape, a board shape, a belt shape and a spherical shape. The carrier should preferably be formed into a structure having a plurality of parallel paths separated from each other. FIG. 2 illustrates a carrier "A" having a structure in which a plurality of parallel paths 10 separated from each other are formed by arranging a wavy partition 9 between a pair of side walls 8a and 8b. FIG. 3 illustrates another carrier "B" having a honeycomb structure in which a plurality of parallel paths 13 separated from each other are formed by arranging a plurality of horizontal walls 11a and 11b crossing at right angles with a plurality of vertical walls 12a and 12b. By using the carrier "A" or "B" having the structure as described above, the combustion waste gas passes through the paths 10 or 13 described above, so that dust contained in the combustion waste gas hardly adheres to the catalyst supported on the surface of the carrier "A" or "B" in the above-mentioned paths 10 or 13. This permits the stable operation for a long period of time without causing the increase in pressure drop resulting from adherence of dust to the catalyst or the decrease in the functions of the catalyst.

The combustion waste gas added with ammonia as the reducing agent in the mixing chamber 1 is then introduced into the reactor 2 as shown in FIG. 1. The temperature of the combustion waste gas in the reactor 2 exerts an important effect on the removing efficiency of nitrogen oxides and organic chlorine compounds from the combustion waste gas. When the temperature of the combustion waste gas is under 150° C., the reduction reaction of nitrogen oxides and the oxidation reaction of organic chlorine compounds in the reactor 2 are insufficient, leading to a serious decrease in the removing efficiency of nitrogen oxides and organic chlorine compounds from the combustion waste gas, and the functions of the catalyst are largely impaired by the presence of residual sulfur oxides ($SO_x$) and hydrogen chloride (HCl) in the combustion waste gas. When the temperature of the combustion waste gas is over 340° C., on the other hand, the above-mentioned functions of the catalyst cause the reaction between ammonia as the reducing agent added to the combustion waste gas and oxygen contained in the combustion waste gas, resulting in considerable production of nitrogen oxides. The temperature of the combustion waste gas in the reactor 2 should therefore be limited within a range of from 150° to 340° C.

By introducing the combustion waste gas added with ammonia as the reducing agent into the reactor 2 while keeping the temperature of the combustion waste gas within a range of from 150° to 340° C., the combustion waste gas contacts with the above-mentioned catalyst arranged in the reactor 2 under the presence of ammonia and oxygen, thus causing the reduction and the decomposition of nitrogen oxides contained in the combustion waste gas, and at the same time, the oxidation and the decomposition of organic chlorine compounds, thereby permitting efficient removal of nitrogen oxides and organic chlorine compounds from the combustion waste gas.

In the first method of the present invention, addition of ammonia to the combustion waste gas so as to achieve a ratio of ammonia to nitrogen oxides (i.e., $NH_3/NO_x$) of at least 1 in molar ratio, can further improve the removing efficiency of nitrogen oxides. When ammonia is added to the combustion waste gas at such a ratio, residual ammonia in the combustion waste gas is mostly decomposed into nitrogen and water in the reactor 2 unless the amount of residual ammonia is about 200 ppm or over, thus preventing adverse effect of residual ammonia.

In the first method of the present invention, furthermore, ammonia is continuously added to the combustion waste gas in the mixing chamber 1. This addition of ammonia may be intermittent. When ammonia is intermittently added to the combustion waste gas, part of ammonia is adsorbed into the catalyst and the carrier supporting same arranged in the reactor 2, so that the reduction reaction of nitrogen oxides contained in the combustion waste gas substantially continuously takes place in the reactor 2.

In the first method of the present invention, the concentration of nitrogen oxides in the combustion waste gas may be measured after the step 2, and the amount of ammonia as the reducing agent to be added to the combustion waste gas in the step 1 may be adjusted on the basis of the thus measured concentration of nitrogen oxides in the combustion waste gas.

FIG. 4 is a flow diagram illustrating a first embodiment of a second method of the present invention.

The first embodiment of the second method of the present invention comprises: a step of adding ammonia ($NH_3$) as a reducing agent to a combustion waste gas containing nitrogen oxides, organic chlorine compounds and oxygen (hereinafter referred to as the "step I"), a step of causing the combustion waste gas added with ammonia as the reducing agent to contact, while keeping the temperature of the combustion waste gas within a prescribed range as described later, with a catalyst for reducing nitrogen oxides having a prescribed chemical composition as described later under the presence of ammonia, to remove nitrogen oxides from the combustion waste gas (hereinafter referred to as the "step II"), and a step of causing the combustion waste gas from which nitrogen oxides have thus been removed to contact, while keeping the temperature of the combustion waste gas within a prescribed range as described later, with a catalyst for oxidizing organic chlorine compounds having a prescribed chemical composition as described later under the presence of oxygen, to remove organic chlorine compounds from the combustion waste gas (hereinafter referred to as the "step III"). As shown in FIG. 4, the step I is carried out in a mixing chamber 1 provided between an incinerator (not shown) and a stack (not shown), the step II is conducted in a removing reactor of nitrogen oxides 3 provided between the mixing chamber 1 and the stack, and the step III is effected in a removing reactor of organic chlorine compounds 4 provided between the removing reactor of nitrogen oxides 3 and the stack.

Since the step I is the same as the step 1 in the above-mentioned first method of the present invention, the description thereof is omitted here.

A catalyst for reducing nitrogen oxides is arranged in the removing reactor of nitrogen oxides 3. The catalyst for reducing nitrogen oxides comprises vanadium (V) and is supported on the surface of a carrier comprising titanium oxide ($TiO_2$).

Since the shape of the carrier supporting the catalyst for reducing nitrogen oxides on the surface thereof is the same as that of the carrier used in the above-mentioned first method of the present invention, the description thereof is omitted here.

The combustion waste gas added with ammonia as the reducing agent in the mixing chamber 1 is then introduced into the removing reactor of nitrogen oxides 3 as shown in FIG. 4. The temperature of the combustion waste gas in the removing reactor of nitrogen oxides 3 exerts an important effect on the removing efficiency of nitrogen oxides from the combustion waste gas. More specifically, when the temperature of the combustion waste gas is under 150° C., the reduction reaction of nitrogen oxides in the removing reactor of nitrogen oxides 3 is insufficient, leading to a serious decrease in the removing efficiency of nitrogen oxides from the combustion waste gas, and the function of the catalyst for reducing nitrogen oxides is largely impaired by the presence of residual sulfur oxides ($SO_x$) and hydrogen chloride (HCl) in the combustion waste gas. When the temperature of the combustion waste gas is over 500° C., on the other hand, the reaction between ammonia as the reducing agent added to the combustion waste gas and oxygen contained in the combustion waste gas causes the production of nitrogen oxides. The temperature of the combustion waste gas in the removing reactor of nitrogen oxides 3 should therefore be limited within a range of from 150° to 500° C.

By introducing the combustion waste gas added with ammonia as the reducing agent into the removing reactor of nitrogen oxides 3 while keeping the temperature of the combustion waste gas within a range of from 150° to 500° C., the combustion waste gas contacts with the above-mentioned catalyst for reducing nitrogen oxides arranged in the removing reactor of nitrogen oxides 3 under the presence of ammonia, thus causing the reduction and the decomposition of nitrogen oxides contained in the combustion waste gas, thereby permitting efficient removal of nitrogen oxides from the combustion waste gas.

A catalyst for oxidizing organic chlorine compounds is arranged in the removing reactor of organic chlorine compounds 4. The catalyst for oxidizing organic chlorine compounds comprises at least one selected from the group consisting of platinum (Pt), palladium (Pd), ruthenium (Ru), manganese (Mn), copper (Cu), chromium (Cr) and iron (Fe) and oxides thereof, and is supported on the surface of a carrier comprising at least one selected from the group consisting of titanium oxide ($TiO_2$), silicon oxide ($SiO_2$), aluminum oxide ($Al_2O_3$) and zirconium oxide ($ZrO_2$). By using the above-mentioned catalyst for oxidizing organic chlorine compounds, it is possible to prevent deterioration of the function of the catalyst caused by sulfur oxide ($SO_x$), hydrogen chloride (HCl) or halogen contained in the combustion waste gas, thus permitting maintenance of the stable function of the catalyst for a long period of time.

The carrier supporting such a catalyst for oxidizing organic chlorine compounds on the surface thereof should preferably comprise any one selected from the group consisting of a composite compound ($TiO_2$-$SiO_2$) of titanium oxide and silicon oxide, a composite compound ($TiO_2$-$ZrO_2$) of titanium oxide and zirconium oxide, a composite compound ($TiO_2$-$SiO_2$-$Al_2O_3$) of titanium oxide, silicon oxide and aluminum oxide, and a composite compound ($TiO_2$-$SiO_2$-$ZrO_2$) of titanium oxide, silicon oxide and zirconium oxide.

When the above-mentioned carrier is formed of a substrate comprising mullite ($3Al_2O_3.SiO_2$) and a layer comprising titanium oxide ($TiO_2$) formed on the surface of the substrate, the substrate comprising mullite ($3Al_2O_3. SiO_2$) is protected by the titanium oxide ($TiO_2$) layer, thus improving resistance to acid of the carrier. In addition, the titanium oxide ($TiO_2$) layer, having fine jogs on the surface thereof, has a large surface area sufficient to support a large quantity of fine particles of catalyst, thus permitting effective performance of the function of the catalyst.

Since the shape of the carrier supporting the catalyst for oxidizing organic chlorine compounds on the surface thereof is the same as that of the carrier used in the above-mentioned first method of the present invention, the description thereof is omitted here.

The combustion waste gas, from which nitrogen oxides have been removed in the removing reactor of nitrogen oxides 3 as described above, is then introduced into the removing reactor of organic chlorine compounds 4 as shown in FIG. 4. The temperature of the combustion waste gas in the removing reactor organic chlorine compounds 4 exerts an important effect not only on the removing efficiency of organic chlorine compounds from the combustion waste gas, but also on the reproduction of nitrogen oxides.

More specifically, when the temperature of the combustion waste gas is under 150° C., the oxidation reaction of organic chlorine compounds in the removing reactor of organic chlorine compounds 4 is insufficient, leading to a serious decrease in the removing efficiency of organic chlorine compounds from the combustion waste gas, and the function of the catalyst for oxidizing organic chlorine compounds is largely impaired by the presence of residual sulfur oxides ($SO_x$) and hydrogen chloride (HCl) in the combustion waste gas. When the temperature of the combustion waste gas is over 500° C., on the other hand, the reaction between residual ammonia in a slight amount in the combustion waste gas and oxygen contained in the combustion waste gas causes the production of nitrogen oxides. The temperature of the combustion waste gas in the removing reactor of organic chlorine compounds 4 should therefore be limited within a range of from 150° to 500° C.

By introducing the combustion waste gas, from which nitrogen oxides have been removed in the removing reactor of nitrogen oxides 3 as described above, into the removing reactor of organic chlorine compounds 4 while keeping the temperature of the combustion waste gas within a range of from 150° to 500° C., the combustion waste gas contacts with the above-mentioned catalyst for oxidizing organic chlorine compounds arranged in the removing reactor of organic chlorine compounds 4 under the presence of oxygen, thus causing the oxidation and the decomposition of organic chlorine compounds contained in the combustion waste gas, thereby permitting efficient removal of organic chlorine compounds from the combustion waste gas.

In the first embodiment of the second method of the present invention, addition of ammonia to the combustion waste gas so as to achieve a ratio of ammonia to nitrogen oxides (i.e., NH$_3$/NO$_x$) of at least 1 in molar ratio, can further improve the removing efficiency of nitrogen oxides. When ammonia is added to the combustion waste gas at such a ratio, residual ammonia in the combustion waste gas is mostly decomposed into nitrogen and water in the removing reactor of organic chlorine compounds 4 unless the amount of residual ammonia is about 50 ppm or over, thus preventing adverse effect of residual ammonia.

In the first embodiment of the second method of the present invention, furthermore, ammonia is continuously added to the combustion waste gas in the mixing chamber 1. This addition of ammonia may be intermittent. When ammonia is intermittently added to the combustion waste gas, part of ammonia is absorbed into the catalyst for reducing nitrogen oxides and the carrier supporting same arranged in the removing reactor of nitrogen oxides 3, so that the reduction reaction of nitrogen oxides contained in the combustion waste gas substantially continuously takes place in the removing reactor of nitrogen oxides 3.

In the first embodiment of the second method of the present invention, the removing reactor of nitrogen oxides 3 and the removing reactor of organic chlorine compounds 4 are separately provided between the mixing chamber 1 and the stack (not shown). It is however possible to provide a single reactor between the mixing chamber 1 and the stack (not shown) and to arrange the above-mentioned catalyst for reducing nitrogen oxides and the above-mentioned catalyst for oxidizing organic chlorine compounds in this single reactor. In this case, with a view to removing not only nitrogen oxides and organic chlorine compounds contained in the combustion waste gas but also residual ammonia in the combustion waste gas, it is desirable to arrange the catalyst for reducing nitrogen oxides and the catalyst for oxidizing organic chlorine compounds in this order from the upstream side toward the downstream side in the flow direction of the combustion waste gas in the above-mentioned single reactor. By arranging the catalyst for reducing nitrogen oxides and the catalyst for oxidizing organic chlorine compounds in a single reactor as described above, it is possible to achieve a smaller-scale equipment for the disposal of the combustion waste gas and thus reduce the equipment and running costs.

FIG. 5 is a flow diagram illustrating a second embodiment of the second method of the present invention.

The second embodiment of the second method of the present invention is the same as the above-mentioned first embodiment of the second method of the present invention except that a concentration meter of nitrogen oxides 5 is provided on the exit side of the removing reactor of organic chlorine compounds 4, i.e., between the removing reactor of organic chlorine compounds 4 and the stack (not shown) as shown in FIG. 5.

More specifically, in the second embodiment of the second method of the present invention, as shown in FIG. 5, nitrogen oxides are removed from the combustion waste gas in the removing reactor of nitrogen oxides 3, and then, organic chlorine compounds are removed from the combustion waste gas in the removing reactor of organic chlorine compounds 4. Then, the concentration of nitrogen oxides in the combustion waste gas is measured by means of the concentration meter of nitrogen oxide 5 at the exit side of the removing reactor of organic chloride compounds 4, and the amount of ammonia as the reducing agent to be added to the combustion waste gas in the mixing chamber 1 is adjusted on the basis of the thus measured concentration of nitrogen oxides in the combustion waste gas.

FIG. 6 is a flow diagram illustrating a third embodiment of the second method of the present invention.

The third embodiment of the second method of the present invention is the same as the above-mentioned first embodiment of the second method of the present invention except for the following points:

(1) a first concentration meter of nitrogen oxides 5 is provided on the exit side of the removing reactor of organic chlorine compounds 4, i.e., between the removing reactor of organic chlorine compounds 4 and the stack (not shown);

(2) a second concentration meter of nitrogen oxides 6 is provided on the entry side of the mixing chamber 1, i.e., between the incinerator (not shown) and the mixing chamber 1; and (3) a computer 7 is provided, for calculating the difference between the concentration of nitrogen oxides in the combustion waste gas as measured by the first concentration meter of nitrogen oxides 5 and the concentration of nitrogen oxides in the combustion waste gas as measured by the second concentration meter of nitrogen oxides 6 and adjusting the amount of ammonia as the reducing agent to be added to the combustion waste gas in the mixing chamber 1 on the basis of the thus calculated difference.

More specifically, in the third embodiment of the second method of the present invention, as shown in FIG. 6, the concentration of nitrogen oxides in the combustion waste gas is measured by means of the second concentration meter of nitrogen oxides 6 at the entry side of the mixing chamber 1 before the introduction of the combustion waste gas into the mixing chamber 1. Then, nitrogen oxides are removed from the combustion waste gas in the removing reactor of nitrogen oxides 3 and organic chlorine compounds are removed from the combustion waste gas in the removing reactor of organic chlorine compounds 4. Then, the concentration of nitrogen oxides in the combustion waste gas discharged from the removing reactor of organic chlorine compounds 4 is measured by means of the first concentration meter of nitrogen oxides 5 at the exit side of the removing reactor of organic chlorine compounds 4. Then, the difference between the concentration of nitrogen oxides in the combustion waste gas as measured by means of the first concentration meter of nitrogen oxides 5, on the one hand, and the concentration of nitrogen oxides in the combustion waste gas as measured by means of the second concentration meter of nitrogen oxides 6, on the other hand, is calculated by means of the computer 7, and a device (not shown) for supplying ammonia as the reducing agent to the combustion waste gas in the mixing chamber 1, is controlled on the basis of the thus calculated difference to adjust the amount of ammonia as the reducing agent to be added to the combustion waste gas in the mixing chamber 1.

According to the third embodiment of the second method of the present invention, it is possible to add ammonia as the reducing agent always in an appropriate amount to the combustion waste gas in the mixing chamber 1 and thus to efficiently remove nitrogen oxides from the combustion waste gas even when the concentration of nitrogen oxides in the combustion waste gas discharged from the incinerator varies.

Figure 8:
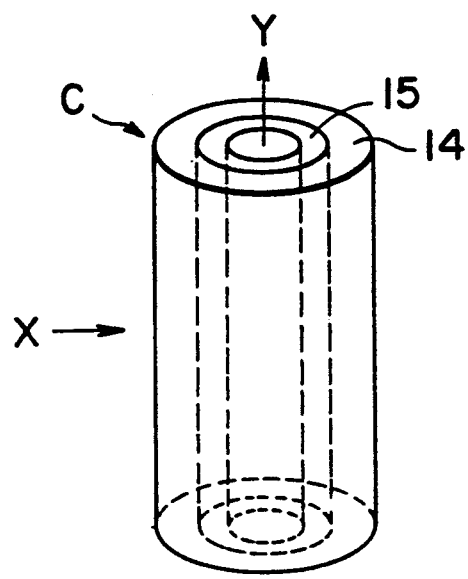
FIG. 8 is a schematic perspective view illustrating an embodiment of the filter of the present invention.

Now, the filter of the present invention is described in detail with reference to the drawing. FIG. 8 is a schematic perspective view illustrating an embodiment of the filter of the present invention.

The filter "C" of the present invention is to be attached to a dust collector (not shown), and comprises a cylindrical outer layer 14 and a cylindrical inner layer 15 arranged concentrically in the cylindrical outer layer 14 in a tight contact therewith, as shown in FIG. 8.

The outer layer 14 comprises at least one selected from the group consisting of titanium oxide ($TiO_2$), silicon oxide ($SiO_2$), aluminum oxide ($Al_2O_3$) and zirconium oxide ($ZrO_2$) and is formed into a porous structure. The outer layer 14 has a function of removing dust from the combustion waste gas.

The cylindrical inner layer 15 is concentrically and tightly fitted into the cylindrical outer layer 14. The inner layer 15 comprises a porous carrier, which comprises at least one selected from the group consisting of titanium oxide ($TiO_2$), silicon oxide ($SiO_2$), aluminum oxide ($Al_2O_3$) and zirconium oxide ($ZrO_2$) and is formed into a cylindrical shape, and a catalyst, which comprises at least one selected from the group consisting of platinum (Pt), palladium (Pd), ruthenium (Ru), manganese (Mn), copper (Cu), chromium (Cr) and iron (Fe) and oxides thereof, and is supported in the pores of the carrier. By using the above-mentioned catalyst, it is possible to prevent deterioration of the functions of the catalyst caused by sulfur oxides ($SO_x$), hydrogen chloride (HCl) or halogen contained in the combustion waste gas, thus permitting maintenance of the stable functions of the catalyst for a long period of time.

The outer layer 14 and the inner layer 15 should preferably have an apparent porosity within a range of from 10% to 30%.

The above-mentioned carrier of the inner layer 15 should preferably comprise any one selected from the group consisting of a composite compound ($TiO_2$-$SiO_2$) of titanium oxide and silicon oxide, a composite compound ($TiO_2$-$ZrO_2$) of titanium oxide and zirconium oxide, a composite compound ($TiO_2$-$SiO_2$-$Al_2O_3$) of titanium oxide, silicon oxide and aluminum oxide, and a composite compound ($TiO_2$-$SiO_2$-$ZrO_2$) of titanium oxide, silicon oxide and zirconium oxide.

The combustion waste gas passes through the outer layer 14 and the inner layer 15 in the arrow direction X in FIG. 8, and is discharged through a space along the center axis of the inner layer 15 in the arrow direction Y. When the combustion waste gas passes through the filter "C", dust in the combustion waste gas is mostly removed by the outer layer 14, and organic chlorine compounds in the combustion waste gas contact with the above-mentioned catalyst supported in the pores of the carrier of the inner layer 15 under the presence of oxygen, are oxidized, and are decomposed.

The filter "C" of the present invention shown in FIG. 8 has been described above as comprising the cylindrical outer layer 14 and the cylindrical inner layer 15, but may be of any structure and shape, and the only requirement is that at least a part of the filter comprises a catalyst, which contacts with nitrogen oxides contained in the combustion waste gas to reduce same so as to decompose same, and at the same time, contacts with organic chlorine compounds contained in the combustion waste gas to oxidize same so as to decompose same. A few modifications of the filter of the present invention are presented below.

(1) a filter comprising the porous carrier and the above-mentioned catalyst supported in the pores of the carrier, in which at least 70% of the catalyst used are supported in the pores in the portion of a length of up to 50% of the overall thickness of the filter from the discharging side of the combustion waste gas.

(2) a filter comprising the porous carrier and the above-mentioned catalyst supported on one surface portion of the carrier, in which the side of the other surface portion of the carrier supporting no catalyst is arranged on the introducing side of the combustion waste gas, and the side of the one surface portion of the carrier supporting the catalyst is arranged on the discharging side of the combustion waste gas.

(3) a filter comprising the filter cloth of the same material as in the conventional filter, and the above-mentioned catalyst supported on one surface of the filter cloth, in which the side of the other surface of the filter cloth supporting no catalyst is arranged on the introducing side of the combustion waste gas, and the side of the one surface portion of the filter cloth supporting the catalyst is arranged on the discharging side of the combustion waste gas.

According to the filter "C" shown in FIG. 8 and described above and the above-mentioned filters (1) to (3), dust contained in the combustion waste gas is mostly removed on the introducing side portion of the combustion waste gas of the filter, and it is possible to prevent dust from adhering onto the surface of the catalyst, thus permitting maintenance of the stable functions of the catalyst for a long period of time.

In addition, when the carrier for supporting the catalyst is formed of a substrate comprising mullite ($3Al_2O_3.SiO_2$) and a layer comprising titanium oxide ($TiO_2$) formed on the surface of the substrate, the substrate comprising mullite ($3Al_2O_3.SiO_2$) is protected by the titanium oxide ($TiO_2$) layer, thus permitting improvement of resistance to acid of the carrier. Furthermore, since the titanium oxide ($TiO_2$) layer has fine jogs on the surface thereof, it is possible to ensure a large surface area sufficient to support a large quantity of fine particles of the catalyst as described later, thus permitting effective performance of the functions of the catalyst.

The above-mentioned catalyst used in the filter of the present invention has a function of accelerating a catalytic reaction of reducing nitrogen oxides contained in the combustion waste gas and another function of accelerating a catalytic reaction of oxidizing organic chlorine compounds contained in the combustion waste gas. By adding ammonia as the reducing agent to the combustion waste gas, therefore, it is possible to remove not only dust and organic chlorine compounds but also nitrogen oxides from the combustion waste gas.

When at least a part of the filter of the present invention comprises the catalyst for reducing nitrogen oxides comprising vanadium (V), and the above-mentioned catalyst, i.e., the catalyst comprising at least one selected from the group consisting of platinum (Pt), palladium (Pd), ruthenium (Ru), manganese (Mn), copper (Cu), chromium (Cr) and iron (Fe) and oxides thereof, it is possible to remove dust, organic chlorine compounds and nitrogen oxides, and particularly, to improve the removing efficiency of nitrogen oxides.

Figure 9:
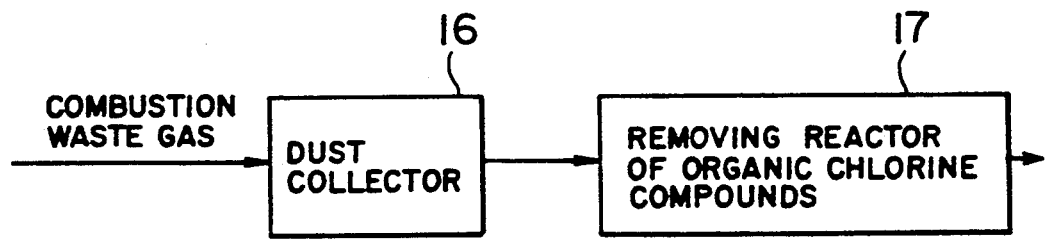
FIG. 9 is a flow diagram illustrating a conventional method for removing dust and organic chlorine compounds from a combustion waste gas.

According to the above-mentioned filter of the present invention, unlike the conventional method as shown in FIG. 9, it is not necessary to provide a removing reactor of organic chlorine compounds 17 in the downstream of a dust collector 16, and it is possible to achieve a small-scale equipment for the disposal of the combustion waste gas, and thus to reduce the equipment and running costs.

Now, the method of the present invention for removing nitrogen oxides and organic chlorine compounds from the combustion waste gas, and the filter of the present invention, to be attached to a dust collector, for removing dust and organic chlorine compounds from the combustion waste gas, are described below further in detail by means of examples while comparing with examples for comparison.

EXAMPLE 1

A carrier "A", which comprised a substrate comprising mullite ($3Al_2O_3 \cdot SiO_2$) and a layer comprising titanium oxide ($TiO_2$) formed on the surface of the substrate, and had a structure as shown in FIG. 2, was prepared. The content of titanium oxide ($TiO_2$) was 60 wt.% relative to the carrier "A". The portions of the carrier "A" had the following dimensions:

| | |
|---|---|
| (1) Distance "a" between a pair of side walls 8a and 8b | 3.7 mm, |
| (2) Pitch "b" of waves of a wavy partition 9 | 7.5 mm, |
| (3) Thickness "c" of the wavy partition | 0.4 mm, |
| (4) Thickness "d" of the pair of side walls 8a and 8b and | 0.5 mm, |
| (5) Porosity | 77%. |

Fine particles of platinum (Pt) as a catalyst were supported by a known method on the surface of the above-mentioned carrier "A" to prepare an element I for removing nitrogen oxides and organic chlorine compounds. The amount of supported platinum (Pt) was 2.5 g per 1,000 $cm^3$ of the volume of the carrier "A".

Detrimental substances were removed from a combustion waste gas in accordance with the first method of the present invention as shown in FIG. 1, with the use of the element I for removing nitrogen oxides and organic chlorine compounds.

More specifically, a combustion waste gas containing nitrogen oxides ($NO_x$) in an amount of from 130 to 180 ppm and polychlorinated dibenzo-p-dioxins (PCDDs) as organic chlorine compounds in an amount of from 2,000 to 4,000 ng/$Nm^3$, was introduced into a mixing chamber 1, where ammonia as a reducing agent was added to the combustion waste gas.

Then, the combustion waste gas added with ammonia was introduced into a reactor 2, in which the element I for removing nitrogen oxides and organic chlorine compounds was arranged, to cause the combustion waste gas to contact with the catalyst of the element I under the presence of ammonia and oxygen so as to reduce and decompose nitrogen oxides ($NO_x$) contained in the combustion waste gas, and at the same time, so as to oxidize and decompose polychlorinated dibenzo-p-dioxins (PCDDs) as organic chlorine compounds contained in the combustion waste gas.

In the above-mentioned Example 1, the ratio of removal of or increase in nitrogen oxides ($NO_x$) and the ratio of removal polychlorinated dibenzo-p-dioxins (PCDDs) were investigated while changing the temperature of the combustion waste gas in the reactor 2. The results are shown in Table 1.

The amount of ammonia added to the combustion waste gas, i.e., the molar ratio of ammonia to nitrogen oxides contained in the combustion waste gas (i.e., $NH_3/NO_x$), the temperature of the combustion waste gas in the reactor 2, and the space velocity thereof in the reactor 2 are also shown in Table 1.

TABLE 1

| No. | Amount of ammonia ($NH_3/NO_x$) | Temperature of combustion waste gas in reactor (°C.) | Space velocity (SV) ($hr^{-1}$) | Removing ratio of $NO_x$ (%) | Increasing ratio of $NO_x$ (%) | Removing ratio of PCDDs (%) |
|---|---|---|---|---|---|---|
| Method of the invention | | | | | | |
| 1 | 1.5 | 200 | 3,000 | 88.3 | — | 99.4 |
| 2 | 1.5 | 250 | 3,000 | 75.6 | — | 99.8 |
| 3 | 1.5 | 275 | 3,000 | 73.5 | — | 99.8 |
| 4 | 1.5 | 275 | 7,500 | 71.5 | — | 90.2 |
| 5 | 1.5 | 300 | 7,500 | 65.4 | — | 94.1 |
| Method for comparison | | | | | | |
| 1 | 1.5 | 350 | 7,500 | — | 36.8 | 95.3 |

In the methods of the present invention Nos. 1 to 5, as is clear from Table 1, nitrogen oxides ($NO_x$) and polychlorinated dibenzo-p-dioxins (PCDDs) as organic chlorine compounds were efficiently removed from the combustion waste gas.

In the method for comparison No. 1, in which the temperature of the combustion waste gas in the reactor 2 was high outside the scope of the first method of the present invention, on the other hand, although polychlorinated dibenzo-p-dioxins (PCDDs) as organic chlorine compounds were efficiently removed from the combustion waste gas, nitrogen oxides ($NO_x$) were not removed from the combustion waste gas, but the amount of nitrogen oxides ($NO_x$) contained in the combustion waste gas discharged from the reactor 2 largely increased by 36.8% over the amount of nitrogen oxides ($NO_x$) contained in the combustion waste gas before the introduction thereof into the mixing chamber 1. The reason was that the temperature of the combustion waste gas in the reactor 2 was high outside the scope of the first method of the present invention, and this caused the production of nitrogen oxides ($NO_x$) in a large quantity in the reactor 2.

EXAMPLE 2

A carrier "B" comprising titanium oxide ($TiO_2$) and having a structure as shown in FIG. 3 was prepared. The portions of the carrier "B" had the following dimensions:

| | |
|---|---|
| (1) Width "e" of each of a plurality of parallel paths 13 and | 6.0 mm; |
| (2) Thickness "f" of each of a plurality of horizontal walls 11a and 11b and a plurality of vertical walls 12a and 12b | 1.0 mm. |

Fine particles of vanadium (V) as a catalyst for reducing nitrogen oxides were supported by a known method on the surface of the above-mentioned carrier "B" to prepare an element II for reducing nitrogen oxides. The amount of supported vanadium (V) was 10 wt.% relative to the amount of titanium oxide ($TiO_2$) forming the carrier "B".

Another carrier "B" comprising a composite compound ($TiO_2$-$SiO_2$) of titanium oxide and silicon oxide and having a structure as shown in FIG. 3 was prepared. The ratio of titanium to silicon (Ti:Si) in the other carrier "B" was 8.5:1.5 in molar ratio. The portions of the other carrier "B" had the following dimensions:

| | |
|---|---|
| (1) Width "e" of each of a plurality of parallel paths 13 and | 3.2 mm, |
| (2) Thickness "f" of each of a plurality of horizontal walls 11a and 11b and a plurality of vertical walls 12a and 12b | 0.5 mm. |

Fine particles of platinum (Pt) as a catalyst for oxidizing organic chlorine compounds were supported by a known method on the surface of the above-mentioned other carrier "B" to prepare an element III for oxidizing organic chlorine compounds. The amount of supported platinum (Pt) was 1.5 g per 1,000 $cm^3$ of the volume of the other carrier "B".

By the use of the element II for reducing nitrogen oxides and the element III for oxidizing organic chlorine compounds, detrimental substances were removed from a combustion waste gas in accordance with the first embodiment of the second method of the present invention as shown in FIG. 4.

More specifically, a combustion waste gas containing nitrogen oxides ($NO_x$) in an amount of from 130 to 180 ppm and polychlorinated dibenzo-p-dioxins (PCDDs) as organic chlorine compounds in an amount of from 2,000 to 4,000 ng/$Nm^3$, was introduced into a mixing chamber 1 where ammonia as a reducing agent was added to the combustion waste gas.

Then, the combustion waste gas added with ammonia was introduced into a removing reactor of nitrogen oxides 3, in which the element II for reducing nitrogen oxides was arranged, to cause the combustion waste gas to contact with the catalyst for reducing nitrogen oxides of the element II under the presence of ammonia so as to reduce and decompose nitrogen oxides ($NO_x$) contained in the combustion waste gas. The space velocity (SV) of the combustion waste gas in the removing reactor of nitrogen oxides 3 was 5,000 $hr^{-1}$.

Then, the combustion waste gas, from which nitrogen oxides ($NO_x$) had thus been removed, was introduced into a removing reactor of organic chlorine compounds 4, in which the element III for oxidizing organic chlorine compounds was arranged, to cause the combustion waste gas to contact with the catalyst for oxidizing organic chlorine compounds of the element III under the presence of oxygen so as to oxidize and decompose polychlorinated dibenzo-p-dioxins (PCDDs) as organic chlorine compounds and residual ammonia contained in the combustion waste gas. The space velocity (SV) of the combustion waste gas in the removing reactor of organic chlorine compounds 4 was 2,000 $hr^{-1}$.

In the above-mentioned Example 2, the removing ratio of nitrogen oxides ($NO_x$), the removing ratio of polychlorinated dibenzo-p-dioxins (PCDDs), and the amount of residual ammonia in the combustion waste gas discharged from the removing reactor of organic chlorine compounds 4, were investigated while changing the amount of ammonia added to the combustion waste gas in the mixing chamber 1, and the temperature of the combustion waste gas in the removing reactor of nitrogen oxides 3 and the removing reactor of organic chlorine compounds 4. The results are shown in Table 2.

The amount of ammonia added to the combustion waste gas, i.e., the molar ratio of ammonia to nitrogen oxides contained in the combustion waste gas (i.e., $NH_3/NO_x$), and the temperature of the combustion waste gas in the removing reactor of nitrogen oxides 3 and the removing reactor of organic chlorine compounds 4 are also shown in Table 2.

TABLE 2

| No. | Amount of ammonia ($NH_3/NO_x$) | Temperature of combustion waste gas in reactor (°C.) | Removing ratio of $NO_x$ (%) | Removing ratio of PCDDs (%) | Amount of residual ammonia (ppm) |
|---|---|---|---|---|---|
| Method of the invention | | | | | |
| 6 | 0.7 | 250 | 78.6 | 94.2 | up to 1.0 |
| 7 | 0.7 | 300 | 86.4 | 98.3 | up to 1.0 |
| 8 | 0.7 | 350 | 89.1 | 99.6 | up to 1.0 |
| 9 | 0.7 | 400 | 90.4 | 99.8 | up to 1.0 |
| 10 | 0.7 | 450 | 91.3 | 99.9 | up to 1.0 |
| 11 | 0.9 | 250 | 88.0 | 94.2 | up to 1.0 |
| 12 | 0.9 | 300 | 93.5 | 98.3 | up to 1.0 |
| 13 | 0.9 | 350 | 95.8 | 99.6 | up to 1.0 |
| 14 | 0.9 | 400 | 98.6 | 99.8 | up to 1.0 |
| 15 | 0.9 | 450 | 98.5 | 99.9 | up to 1.0 |
| 16 | 1.0 | 250 | 91.3 | 94.2 | up to 1.0 |
| 17 | 1.0 | 300 | 97.8 | 98.3 | up to 1.0 |
| 18 | 1.0 | 350 | at least 99.0 | 99.6 | up to 1.0 |
| 19 | 1.0 | 400 | at least 99.0 | 99.8 | up to 1.0 |
| 20 | 1.0 | 450 | at least 99.0 | 99.9 | up to 1.0 |

As is clear from Table 2, in all the methods of the present invention Nos. 6 to 20, nitrogen oxides ($NO_x$) and polychlorinated dibenzo-p-dioxins (PCDDs) as organic chlorine compounds were very efficiently removed from the combustion waste gas, and moreover, the amount of residual ammonia in the combustion waste gas discharged from the removing reactor of organic chlorine compounds 4 was so slight as up to 1.0 ppm.

Figure 7:
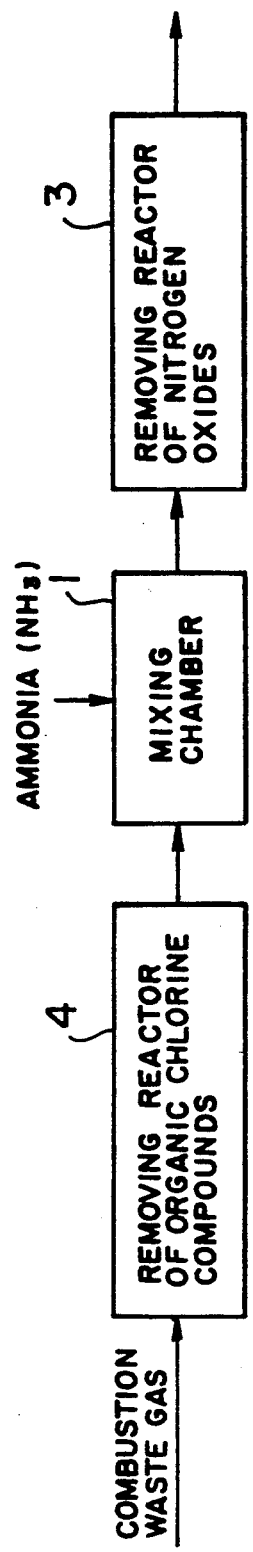
FIG. 7 is a flow diagram illustrating a method for comparison outside the scope of the method of the present invention.

For comparison purposes, detrimental substances were removed from a combustion waste gas in accordance with the conventional method as shown in FIG. 7, with the use of the same element II for reducing nitrogen oxides and the same element III for oxidizing organic chlorine compounds as those in the above-mentioned methods of the present invention Nos 6 to 20.

More specifically, a combustion waste gas containing nitrogen oxides ($NO_x$) in an amount of from 130 to 180 ppm and polychlorinated dibenzo-p-dioxins (PCDDs) as organic chlorine compounds in an amount of from 2,000 to 4,000 ng/$Nm^3$, was introduced into a removing reactor of organic chlorine compounds 4, in which the element III for oxidizing organic chlorine compounds was arranged, to cause the combustion waste gas to contact with the catalyst for oxidizing organic chlorine compounds of the element III under the presence of oxygen so as to oxidize and decompose polychlorinated dibenzo-p-dioxins (PCDDs) as organic chlorine compounds contained in the combustion waste gas. The space velocity (SV) of the combustion waste gas in the removing reactor of organic chlorine compounds 4 was 2,000 $hr^{-1}$.

Then, the combustion waste gas, from which organic chlorine compounds had thus been removed, was introduced into a mixing chamber 1, where ammonia as a reducing agent was added to the combustion waste gas.

Then, the combustion waste gas added with ammonia was introduced into a removing reactor of nitrogen oxides 3, in which the element II for reducing nitrogen oxides was arranged, to cause the combustion waste gas to contact with the catalyst for reducing nitrogen oxides of the element II under the presence of ammonia so as to reduce and decompose nitrogen oxides ($NO_x$) contained in the combustion waste gas. The space velocity of the combustion waste gas in the removing reactor of nitrogen oxides 3 was 5,000 $hr^{-1}$.

In the above-mentioned methods for comparison, the removing ratio of nitrogen oxides ($NO_x$), the removing ratio of polychlorinated dibenzo-p-dioxins (PCDDs), and the amount of residual ammonia in the combustion waste gas discharged from the removing reactor of nitrogen oxides 3, were investigated while changing the amount of ammonia added to the combustion waste gas in the mixing chamber 1, and the temperature of the combustion waste gas in the removing reactor of nitrogen oxides 3 and the removing reactor of organic chlorine compounds 4. The results are shown in Table 3.

The amount of ammonia added to the combustion waste gas, i.e., the molar ratio of ammonia to nitrogen oxides contained in the combustion waste gas (i.e., $NH_3/NO_x$), and the temperature of the combustion waste gas in the removing reactor of nitrogen oxides 3 and the removing reactor of organic chlorine compounds 4 are also shown in Table 3.

TABLE 3

| No. | Amount of ammonia ($NH_3/NO_x$) | Temperature of combustion waste gas in reactor (°C.) | Removing ratio of $NO_x$ (%) | Removing ratio of PCDDs (%) | Amount of residual ammonia (ppm) |
|---|---|---|---|---|---|
| Method for comparison | | | | | |
| 2 | 0.7 | 250 | 57.1 | 93.1 | 5–20 |
| 3 | 0.7 | 300 | 71.4 | 97.7 | 3–10 |
| 4 | 0.7 | 350 | 78.6 | 99.4 | 1–5 |
| 5 | 0.7 | 400 | 82.1 | 99.6 | 1–5 |
| 6 | 0.7 | 450 | 82.0 | 99.7 | 1–5 |
| 7 | 0.9 | 250 | 74.2 | 93.1 | 15–30 |
| 8 | 0.9 | 300 | 83.9 | 97.7 | 10–20 |
| 9 | 0.9 | 350 | 90.6 | 99.4 | 5–15 |
| 10 | 0.9 | 400 | 92.3 | 99.6 | 3–10 |
| 11 | 0.9 | 450 | 93.1 | 99.7 | 3–10 |
| 12 | 1.0 | 250 | 84.7 | 93.1 | 20–50 |
| 13 | 1.0 | 300 | 94.8 | 97.7 | 15–40 |
| 14 | 1.0 | 350 | 96.2 | 99.4 | 10–30 |
| 15 | 1.0 | 400 | 97.3 | 99.6 | 5–20 |
| 16 | 1.0 | 450 | 97.8 | 99.7 | 5–20 |

As is clear from Table 3, in each of the methods for comparison Nos. 2 to 16, the removing ratios of nitrogen oxides ($NO_x$) and polychlorinated dibenzo-p-dioxins (PCDDs) were somewhat inferior to those in each of the above-mentioned methods of the present invention Nos. 6 to 20. Particularly, in each of the methods for comparison Nos. 2 to 16, the amount of residual ammonia in the combustion waste gas discharged from the removing reactor of nitrogen oxides 3 was over the amount of residual ammonia in each of the above-mentioned methods of the present invention Nos. 6 to 20.

Furthermore, the methods for comparison Nos. 2 to 16 were found to have the following problems:

(1) A slight amount of ammonia may incidentally the contained in the combustion waste gas depending upon the combustion conditions in the incinerator. This incidental ammonia is a cause of the production of nitrogen oxides in the removing reactor of organic chlorine compounds 4, resulting in an increase in the amount of nitrogen oxides in the combustion waste gas;

(2) In order to remove nitrogen oxides in such large quantities from the combustion waste gas, it is necessary to add ammonia in a large amount so that the molar ratio of ammonia to nitrogen oxides (i.e., $NH_3/NO_x$) is at least 1 in the mixing chamber 1;

(3) As a result, residual ammonia in the combustion waste gas in the removing reactor of nitrogen oxides 3 and/or equipment located in the downstream thereof, reacts with sulfur oxide ($SO_x$) in the combustion waste gas, to produce ammonium sulfate (($NH_4)_2SO_4$) which may cause corrosion of the removing reactor of nitrogen oxides 3 and the above-mentioned equipment; and (4) With a view to avoiding the above-mentioned problems, when the amount of ammonia added to the combustion waste gas is reduced to under 1 in the molar ratio of ammonia to nitrogen oxides (i.e., NH$_3$/NO$_x$), for example, to a value within a range of from 0.7 to 0.9, the removing ratio of nitrogen oxides from the combustion waste gas decreases to about 70%.

EXAMPLE 3

An element II for reducing nitrogen oxides idential with that in the above-mentioned Example 2 was prepared.

A carrier "A", which comprised a substrate comprising mullite (3Al$_2$O$_3$·SiO$_2$) and a layer comprising titanium oxide (TiO$_2$) formed on the surface of the substrate, and had a structure as shown in FIG. 2, was prepared. The content of titanium oxide (TiO$_2$) was 60 wt.% relative to the carrier "A". The portions of the carrier "A" had the following dimensions:

| | |
|---|---|
| (1) Distance "a" between a pair of side walls 8a and 8b | 3.7 mm, |
| (2) Pitch "b" of waves of a wavy partition 9 | 7.5 mm, |
| (3) Thickness "c" of the wavy partition 9 | 0.4 mm, |
| (4) Thickness "d" of the pair of side walls 8a and 8b and | 0.5 mm, |
| (5) Porosity | 77%. |

Fine particles of platinum (Pt) as a catalyst for oxidizing organic chlorine compounds were supported by a known method on the surface of the above-mentioned carrier "A" to prepare an element IV for oxidizing organic chlorine compounds. The amount of supported platinum (Pt) was 2.0 g per 1,000 cm$^3$ of the volume of the carrier "A".

Detrimental substances were removed from a combustion waste gas in accordance with the first embodiment of the second method of the present invention shown in FIG. 4, with the use of the element II for reducing nitrogen oxides and the element IV for oxidizing organic chloride compounds.

More specifically, a combustion waste gas containing nitrogen oxides (NO$_x$) in an amount of from 130 to 180 ppm and polychlorinated dibenzo-p-dioxins (PCDDs) as organic chlorine compounds in an amount of from 2,000 to 4,000 ng/Nm$^3$, was introduced into a mixing chamber 1, where ammonia as a reducing agent was added to the combustion waste gas. The amount of ammonia added to the combustion waste gas, i.e., the molar ratio of ammonia to nitrogen oxides contained in the combustion waste gas (i.e., NH$_3$/NO$_x$) was 0.9.

Then, the combustion waste gas added with ammonia was introduced into a removing reactor of nitrogen oxides 3, in which the element II for reducing nitrogen oxides was arranged, to cause the combustion waste gas to contact with the catalyst for reducing nitrogen oxides of the element II under the presence of ammonia so as to reduce and decompose nitrogen oxides (NO$_x$) contained in the combustion waste gas. The space velocity (SV) of the combustion waste gas in the removing reactor of nitrogen oxide 3 was 5,000 hr$^{-1}$.

Then, the combustion waste gas, from which nitrogen oxides (NO$_x$) had thus been removed, was introduced into a removing reactor of organic chlorine compounds 4, in which the element IV for oxidizing organic chlorine compounds was arranged, to cause the combustion waste gas to contact with the catalyst for oxidizing organic chlorine compounds of the element IV under the presence of oxygen so as to oxidize and decompose polychlorinated dibenzo-p-dioxins (PCDDs) as organic chlorine compounds and residual ammonia contained in the combustion waste gas. The space velocity (SV) of the combustion waste gas in the removing reactor of organic chlorine compounds 4 was 5,000 hr$^{-1}$.

In the above-mentioned Example 3, the removing ratio of nitrogen oxides (NO$_x$), the removing ratio of polychlorinated dibenzo-p-dioxins (PCDDs), and the amount of residual ammonia in the combustion waste gas discharged from the removing reactor of organic chlorine compounds 4, were investigated while changing the temperature of the combustion waste gas in the removing reactor of nitrogen oxides 3 and the removing reactor of organic chlorine compounds 4. The results are shown in Table 4.

The temperature of the combustion waste gas in the removing reactor of nitrogen oxides 3 and the removing reactor of organic chlorine compounds 4 is also shown in Table 4.

TABLE 4

| No. | Temperature of combustion waste gas in reactor (°C.) | Removing ratio of NO$_x$ (%) | Removing ratio of PCDDs (%) | Amount of residual ammonia (ppm) |
|---|---|---|---|---|
| Method of the invention | | | | |
| 21 | 250 | 88.2 | 95.1 | up to 1.0 |
| 22 | 300 | 92.5 | 98.9 | up to 1.0 |
| 23 | 350 | 96.0 | 99.3 | up to 1.0 |
| 24 | 400 | 98.9 | at least 99.9 | up to 1.0 |
| 25 | 450 | 98.7 | at least 99.9 | up to 1.0 |

As is clear from Table 4, in all the methods of the present invention Nos. 21 to 25, nitrogen oxides (NO$_x$) and polychlorinated dibenzo-p-dioxins (PCDDs) as organic chlorine compounds were very efficiently removed from the combustion waste gas, and moreover, the amount of residual ammonia in the combustion waste gas discharged from the removing reactor of organic chlorine compounds 4 was so slight as up to 1.0 ppm.

For comparison purposes, detrimental substances were removed from a combustion waste gas in accordance with the conventional method as shown in FIG. 7, with the use of the same element II for reducing nitrogen oxides and the same element IV for oxidizing organic chlorine compounds as those in the above-mentioned methods of the present invention Nos. 21 to 25.

More specifically, a combustion waste gas containing nitrogen oxides (NO$_x$) in an amount of from 130 to 180 ppm and polychlorinated dibenzo-p-dioxins (PCDDs) as organic chlorine compounds in an amount of from 2,000 to 4,000 ng/Nm$^3$, was introduced into a removing reactor of organic chlorine compounds 4, in which the element IV for oxidizing organic chlorine compounds was arranged, to cause the combustion waste gas to contact with the catalyst for oxidizing organic chlorine compounds of the element IV under the presence of oxygen so as to oxidize and decompose polychlorinated dibenzo-p-dioxins (PCDDs) as organic chlorine compounds contained in the combustion waste gas. The space velocity (SV) of the combustion waste gas in the removing reactor of organic chlorine compounds 4 was 5,000 hr$^{-1}$.

Then, the combustion waste gas, from which organic chlorine compounds had thus been removed, was introduced into a mixing chamber 1, where ammonia as a reducing agent was added to the combustion waste gas. The amount of ammonia added to the combustion waste gas, i.e., the molar ratio of ammonia to nitrogen oxides contained in the combustion waste gas (i.e., $NH_3/NO_x$) was 0.9.

Then, the combustion waste gas added with ammonia was introduced into a removing reactor of nitrogen oxides 3, in which the element II for reducing nitrogen oxides was arranged, to cause the combustion waste gas to contact with the catalyst for reducing nitrogen oxides of the element II under the presence of ammonia so as to reduce and decompose nitrogen oxides ($NO_x$) contained in the combustion waste gas. The space velocity (SV) of the combustion waste gas in the removing reactor of nitrogen oxides 3 was 5,000 $hr^{-1}$.

In the above-mentioned methods for comparison, the removing ratio of nitrogen oxides ($NO_x$), the removing ratio of polychlorinated dibenzo-p-dioxins (PCDDs), and the amount of residual ammonia in the combustion waste gas discharged from the removing reactor of nitrogen oxides 3, were investigated while changing the temperature of the combustion waste gas in the removing reactor of nitrogen oxides 3 and the removing reactor of organic chlorine compounds 4. The results are shown in Table 5.

The temperature of the combustion waste gas in the removing reactor of nitrogen oxides 3 and the removing reactor of organic chlorine compounds 4 is also shown in Table 5.

TABLE 5

| No. | Temperature of combustion waste gas in reactor (°C.) | Removing ratio of $NO_x$ (%) | Removing ratio of PCDDs (%) | Amount of residual ammonia (ppm) |
| --- | --- | --- | --- | --- |
| Method for comparison | | | | |
| 17 | 250 | 80.3 | 94.5 | 15–40 |
| 18 | 300 | 89.6 | 98.4 | 15–35 |
| 19 | 350 | 91.2 | 99.6 | 10–20 |
| 20 | 400 | 92.1 | 99.8 | 5–20 |
| 21 | 450 | 92.9 | at least 99.9 | 5–10 |

In each of the methods for comparison Nos. 17 to 21, as is clear from Table 5, the removing ratios of nitrogen oxides ($NO_x$) and polychlorinated dibenzo-p-dioxins (PCDDs) were almost equal to those in each of the above-mentioned methods of the present invention Nos. 21 to 25, but in each of the methods for comparison Nos. 17 to 21, the amount of residual ammonia in the combustion waste gas discharged from the removing reactor of nitrogen oxides 3 was over the amount of residual ammonia in each of the above-mentioned methods of the present invention Nos. 21 to 25.

EXAMPLE 4

A filter "C" within the scope of the present invention, which comprised a cylindrical outer layer 14 and a cylindrical inner layer 15 arranged concentrically in the cylindrical outer layer 14 in a tight contact therewith, was prepared as shown in FIG. 8.

More specifically, the porous and cylindrical outer layer 14 comprising a composite compound ($TiO_2$-$SiO_2$) of titanium oxide and silicon oxide was prepared. The ratio of titanium (Ti) to silicon (Si) (i.e., Ti:Si) in the outer layer 14 in molar ratio was 8.5:1.5. The outer layer 14 had the following outside diameter, thickness and apparent porosity:

| (1) Outside diameter | 110 mm, |
| --- | --- |

| -continued | |
| --- | --- |
| (2) Thickness | 1.5 mm, and |
| (3) Apparent porosity | 20%. |

In addition, the cylindrical inner layer 15, which comprised a porous and cylindrical carrier comprising a composite compound ($TiO_2$-$SiO_2$) of titanium oxide and silicon oxide, on the one hand, and fine particles of platinum (Pt) as a catalyst supported in the pores of the carrier, on the other hand, was prepared. The ratio of titanium (Ti) to silicon (Si) (i.e., Ti:Si) in the inner layer 15 in molar ratio was 8.5:1.5. The amount of platinum (Pt) as the catalyst supported in the pores of the carrier was 1.5 g per 1,000 $cm^3$ of volume of the carrier. The inner layer 15 had the following inside diameter, thickness and apparent porosity:

| (1) Inside diameter | 104 mm, |
| --- | --- |
| (2) Thickness | 1.5 mm, and |
| (3) Apparent porosity | 20%. |

The filter "c" of the present invention was prepared by concentrically and tightly fitting the cylindrical inner layer 15 into the cylindrical outer layer 14.

The above-mentioned filter "c" was attached to a known dust collector to remove dust and organic chlorine compounds in a combustion waste gas.

More specifically, the combustion waste gas was passed through the cylindrical outer layer 14 and the cylindrical inner layer 15 in the arrow direction X in FIG. 8 under the following conditions:

| (1) Amount of polychlorinated dibenzo-p-dioxins (PCDDs) in combustion waste gas | from 2,000 to 4,000 $ng/Nm^3$, |
| --- | --- |
| (2) Amount of dust in combustion waste gas | from 10 to 20 $g/Nm^3$, |
| (3) Temperature of combustion waste gas | 250° C., and |
| (4) Flow velocity of combustion waste gas | 0.8 m/second, | and was discharged through a space along the center axis of the cylindrical inner layer 15 in the arrow direction Y.

The amounts of polychlorinated dibenzo-p-dioxins (PCDDs) and dust in the thus discharged combustion waste gas were investigated. The results were as follows:

| (a) Amount of polychlorinated dibenzo-p-dioxins (PCDDs) | from 2 to 5 $ng/Nm^3$, and |
| --- | --- |
| (b) Amount of dust | 0.001 $g/Nm^3$. |

According to the filter "c" of the present invention, as is clear from the above description, not only dust but also polychlorinated dibenzo-p-dioxins (PCDDs) as organic chlorine compounds were efficiently removed.

According to the present invention, as described above in detail, there are provided a method for efficiently removing detrimental substances, i.e., both nitrogen oxides and organic chlorine compounds such as polychlorinated dibenzo-p-dioxins and polychlorinated dibenzofurans from a combustion waste gas discharged from an incinerator, and a filter, to be attached to a dust collector, which efficiently removes not only dust but also the above-mentioned detrimental substances from a combustion waste gas discharged from an incinerator, and permits achievement of a small-scale equipment for the disposal of the combustion waste gas, thereby reducing the equipment and running costs, thus providing industrially useful effects.

What is claimed is:

1. In a method for removing nitrogen oxides and organic chlorine compounds from a combustion waste gas, which comprises the steps of:

adding ammonia ($NH_3$) as a reducing agent to a combustion waste gas containing nitrogen oxides and organic chlorine compounds; and contacting said combustion waste gas containing said ammonia as the reducing agent, while keeping the temperature of said combustion waste gas within a range of from 150° to 340° C., with a catalyst in an effective amount to achieve a catalytic function, said catalyst comprising at least one selected from the group consisting of platinum (Pt), palladium (Pd), ruthenium (Ru), manganese (Mn), copper (Cu), chromium (Cr) and iron (Fe) and oxides thereof, supported on the surface of a carrier, to reduce said nitrogen oxides contained in said combustion waste gas so as to decompose said nitrogen oxides, and at the same time to oxidize said organic chlorine compounds contained in said combustion waste gas so as to decompose said organic chlorine compounds, thereby removing said nitrogen oxides and said organic chlorine compounds from said combustion waste gas;

wherein the improvement comprises:

said carrier comprises a substrate comprising mullite ($3Al_2O_3 \cdot SiO_2$) and a layer comprising titanium oxide ($TiO_2$) formed on the surface of said substrate.

2. A method as claimed in claim 1, wherein:
the concentration of said nitrogen oxides in said combustion waste gas is measured after the step of contacting said combustion was gas with said catalyst; and
the amount of said ammonia as the reducing agent to be added to said combustion waste gas is adjusted on the basis of the thus measured concentration of said nitrogen oxides in said combustion waste gas.

3. A method as claimed in claim 1, wherein: ammonia is added in an amount such that a molar ratio of ammonia to nitrogen oxides of at least 1 is achieved.

4. A method as claimed in claim 3, wherein: the molar ratio of ammonia to nitrogen oxides is 1.5.

5. In a method for removing nitrogen oxides and organic chlorine compounds from a combustion waste gas, which comprises the steps of:

adding ammonia ($NH_3$) as a reducing agent to a combustion waste gas containing nitrogen oxides and organic chlorine compounds;

contacting said combustion waste gas containing said ammonia as the reducing agent, while keeping the temperature of said combustion waste gas within a range of from 150° to 500° C., with a catalyst for reducing nitrogen oxides, in an effective amount to achieve a catalytic function, said catalyst comprising vanadium, supported on the surface of a carrier, to reduce said nitrogen oxides contained in said combustion waste gas so as to decompose said nitrogen oxides, thereby removing said nitrogen oxides from said combustion waste gas; and contacting said combustion waste gas from which said nitrogen oxides have thus been removed, while keeping the temperature of said combustion waste gas within a range of from 150° to 500° C., with a catalyst for oxidizing organic chlorine compounds, in an effective amount to achieve a catalytic function, said catalyst comprising at least one selected from the group consisting of platinum (Pt), palladium (Pd), ruthenium (Ru), manganese (Mn), copper (Cu), chromium (Cr) and iron (Fe) and oxides thereof, supported on the surface of another carrier, to oxidize said organic chlorine compounds and residual ammonia contained in said combustion waste gas so as to decompose the same, thereby removing said organic chlorine compounds and said residual ammonia from said combustion waste gas;

wherein the improvement comprises:

said carrier to support said catalyst for reducing nitrogen oxides on the surface thereof consists essentially of titanium oxide ($TiO_2$), and said another carrier to support said catalyst for oxidizing organic chlorine compounds on the surface thereof comprises a substrate comprising mullite ($3Al_2O_3 \cdot SiO_2$) and a layer comprising titanium oxide ($TiO_2$) formed on the surface of said substrate.

6. A method as claimed in claim 5, wherein:
the concentration of said nitrogen oxides in said combustion waste gas is measured after the step contacting said combustion waste gas with said catalyst for oxidizing organic chlorine compounds; and
the amount of said ammonia as the reducing agent to be added to said combustion waste gas is adjusted on the basis of the thus measured concentration of said nitrogen oxides in said combustion waste gas.

* * * * *